Feb. 8, 1927.

S. B. REDFIELD 1,616,988

TWO-CHAMBER CLEARANCE UNLOADER

Filed Aug. 4, 1926   2 Sheets-Sheet 2

INVENTOR.
Snowden B. Redfield.
BY Herbert G. Ogden
HIS ATTORNEY.

Patented Feb. 8, 1927.

1,616,988

UNITED STATES PATENT OFFICE.

SNOWDEN B. REDFIELD, OF EASTON, PENNSYLVANIA, ASSIGNOR TO INGERSOLL-RAND COMPANY, OF JERSEY CITY, NEW JERSEY, A CORPORATION OF NEW JERSEY.

TWO-CHAMBER CLEARANCE UNLOADER.

Application filed August 4, 1926. Serial No. 127,062.

This invention relates to compressors, but more particularly to a clearance unloader having a plurality of clearance chambers, in this instance two chambers being provided, both for the same end of the cylinder.

The objects of the invention are to enable a multiplicity of unloading steps to be obtained by means of two clearance chambers at one end of the cylinder, and one or more inlet valves at the opposite end of the cylinder having valve openers. By operating the clearance valves and the valve opener or openers in proper predetermined order, the desired number of steps of unloading is obtained The invention is shown in one suitable form in the accompanying drawings, in which—

Figure 1:
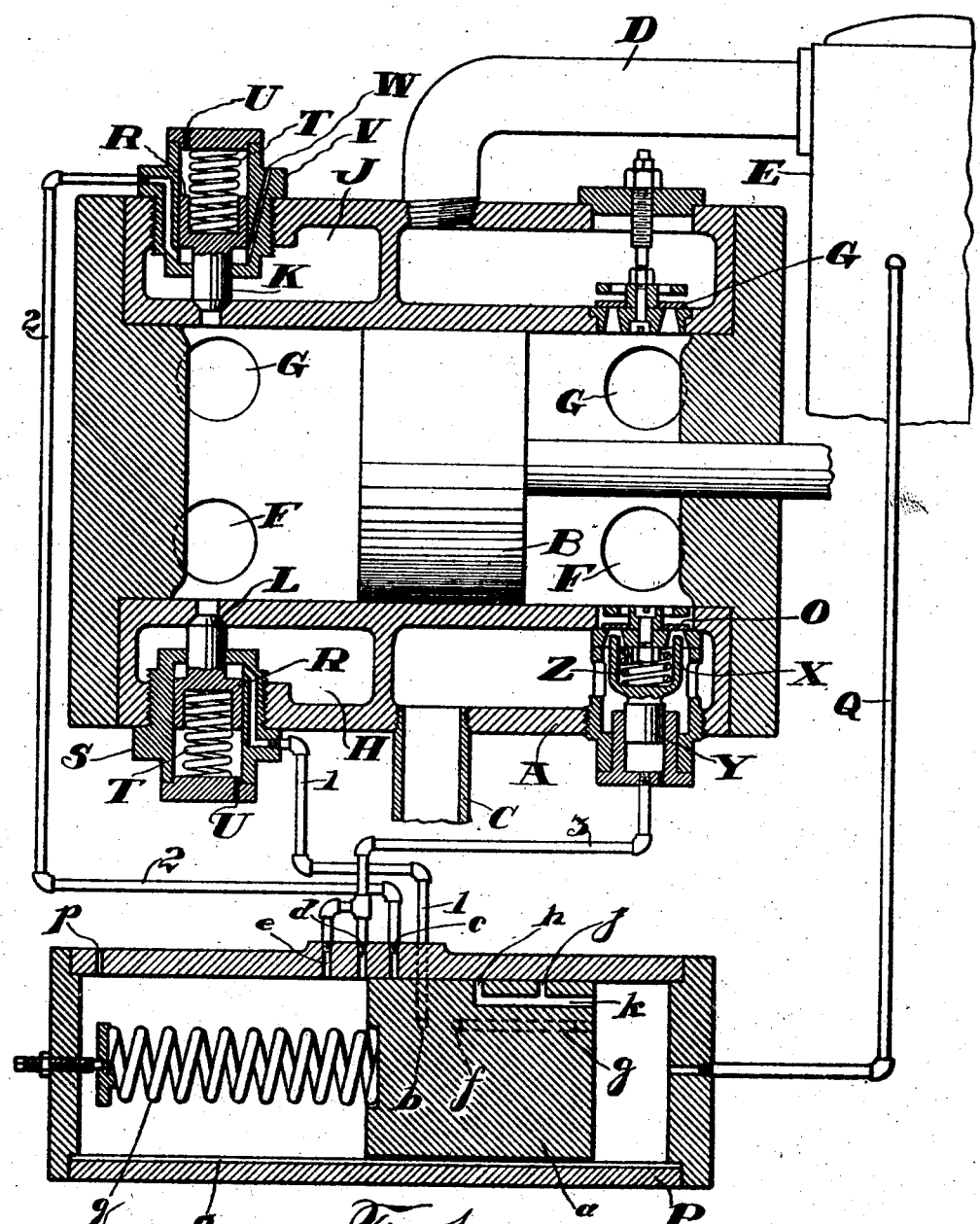
Figure 2:
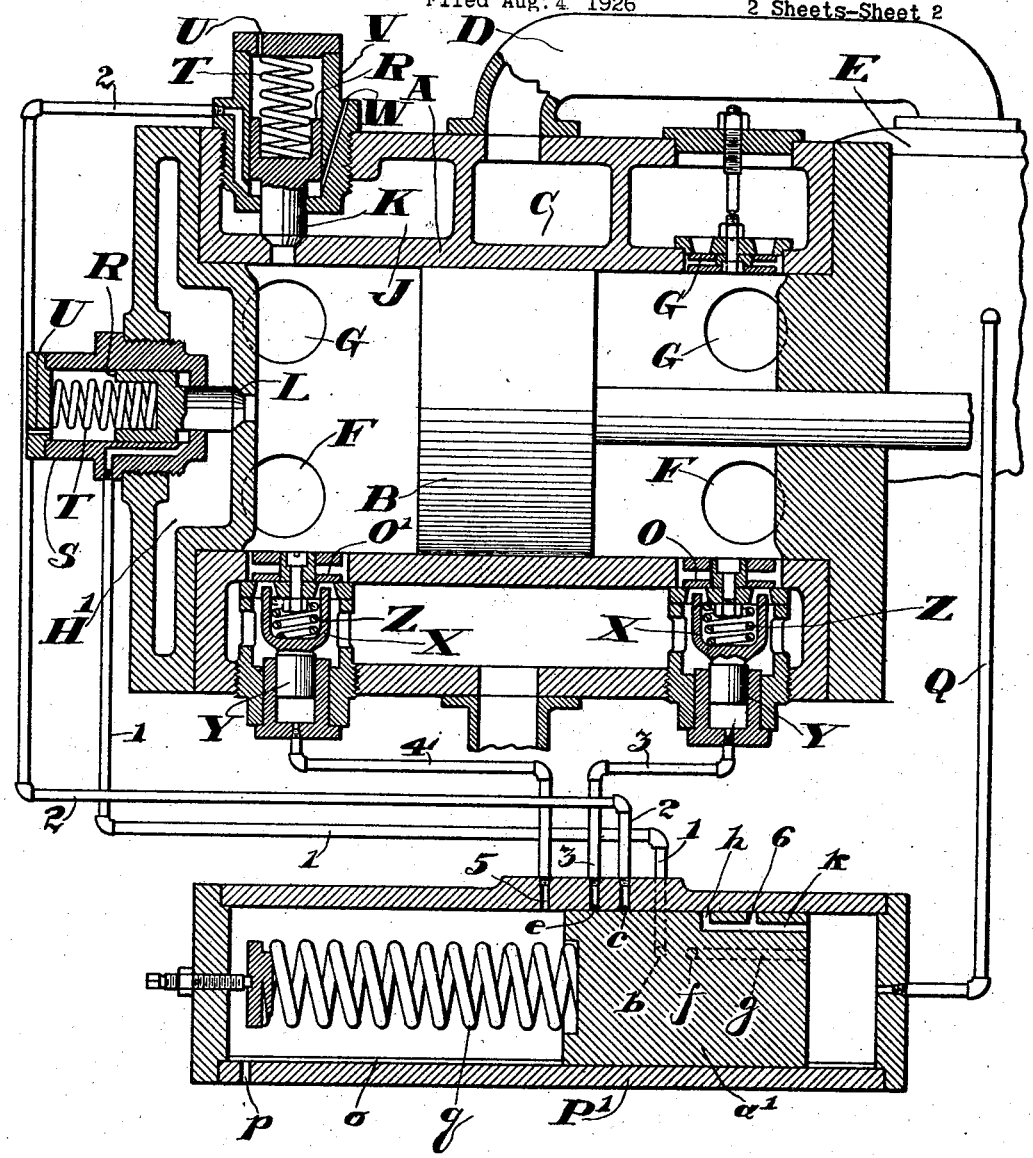

Figure 1 is a diagrammatic representation of an unloading system partly in longitudinal sectional elevation, and Figure 2 is a similar view of a modification.

Referring to the drawings, the cylinder A is provided with a piston B, and the air drawn from the intake C is discharged through the discharge pipe D to the receiver E in the usual manner.

The cylinder is provided with the usual inlet and discharge valves F and G, which may be plate valves of any suitable type, and one end of the cylinder is provided with two clearance chambers H and J having clearance valves K and L while one of the inlet valves at the opposite end of the cylinder, as for instance the inlet valve designated by O, is provided with a valve opener. A regulator P responsive to receiver pressure through the pipe Q is connected to operate the two clearance valves K and L and the valve opener of the valve O in predetermined order, to effect the desired steps of unloading.

The clearance valve L has a piston R in the cylinder S and pressure fluid is supplied underneath the piston through the pipe 1 to open the valve which is maintained closed by the spring T; a vent U vents one end of the cylinder. The clearance valve K is provided with a piston R in the cylinder V and pressure fluid is supplied underneath the piston R from the pipe 2.

In the operation of the device, the clearance valve K is intended to be opened and then closed and reopened in the cycle of operations, so that the cylinder V is provided with the additional vent W and when pressure is cut off from the pipe 2 the valve K is rapidly closed by the spring T due to leakage of pressure through the vent W.

The inlet valve O is provided with the valve opener of any suitable type, in this instance, fingers X being connected to the piston rod of the piston Y. A spring Z normally retracts the fingers X and pressure fluid is supplied behind the piston Y through the pipe 3 for opening the valve and holding it open.

In the cycle of operations controlled by the regulator P, the clearance valve L is first opened to reduce the load by one-quarter. The clearance valve K is next opened for the same end of the cylinder to produce half load while maintaining the clearance valve L open. The clearance valve K is then closed and the inlet valve O at the opposite end of the cylinder is opened to produce one-quarter load, and finally the clearance valve K is reopened to produce no load. By means of this simple system of unloading, five steps of unloading and loading may be produced by means of two clearance chambers for one end of the cylinder and an inlet valve opener or openers for the opposite end of the cylinder.

The regulator P is shown diagrammatically and may be of any suitable type, in this instance, the piston $a$ controls the ports $b$, $c$, $d$ and $e$ connected respectively to the pipes 1, 2 and 3 since the ports $d$ and $e$ are connected to each other. The piston $a$ is provided with the port $f$ and the groove $g$ cooperating with the port $b$ to continuously supply pressure to the cylinder of the clearance valve L so that said valve when once opened is maintained opened through one complete cycle of unloading. The ports $h$ and $j$ connected by the passage $k$ in the piston $a$ are in a different angular plane from the port $f$ and groove $g$ and the piston is guided and prevented from rotating by means of the key or feather $o$. The end of the cylinder opposite to that at which pressure is introduced is provided with the vent $p$ and an adjustable spring $q$ serves to return the piston.

In the operation of the apparatus, let it be assumed that the compressor is running fully loaded and when an increase of pressure in the receiver has moved the piston to the left as Figure 1 is viewed, bringing port *f* in the piston opposite the port *b* in the cylinder of the regulator in that case, pressure fluid will be supplied through the pipe 1 to open the clearance valve L and unload the compressor one-quarter. As the piston *a* continues to move step by step, due to increase of pressure in the receiver, the port *h* of the piston will next fall opposite the port *c* in the regulator cylinder and pressure fluid will be supplied through the pipe 2 to open the clearance valve K and produce half load. In the next step of unloading the port *h* arrives opposite the port *d* which opens the inlet valve O at the opposite end of the cylinder, but pressure fluid is cut off from the pipe 2 causing the clearance valve K to close and thus producing one-quarter load. In the final step of unloading the port *h* cooperates with the port *e* to maintain the inlet valve O open while the port *j* in the piston again supplies pressure through the port *c* and pipe 2 to cause the reopening of the clearance valve K, thus wholly unloading the compressor.

Obviously, if the step of one-quarter load is not desired for any reason, as being unnecessary, that step may be omitted in which case the cycle of operations would produce three-quarters load, half load and no load. In such case the clearance valve L would first be opened and maintained open to produce one-quarter load, then the clearance valve K would be opened and maintained opened to produce half load, and finally the inlet valve O would be opened to produce no load.

In the modification of the apparatus shown in Figure 2, the first three steps of unloading, that is, three-quarters load, one-half load, and one-quarter load are carried out in the same manner as illustrated and described in connection with Figure 1, but the final step to produce no load is effected, not by reopening the clearance valve K, but by holding open the inlet valve O' at the clearance end of the cylinder, otherwise, the system of operation is the same. In Figure 2 the clearance chamber H' corresponds to the clearance chamber H in Figure 1, but for convenience is located in the head of the cylinder. The inlet valve O' at the clearance end of the cylinder is provided with a valve opener similar in all respects to the valve opener for the inlet valve O at the opposite end of the cylinder. The pipe 4 for the inlet valve O' leads to the port 5 in the regulator cylinder and the port *j* shown in Figure 1 in the regulator piston *a* is omitted from the piston *a'* of the regulator P' in Figure 2 and replaced by the port 6. The first three steps of unloading in the operation of the regulator P' in Figure 2 are similar to those described in connection with Figure 1. For the last step, however, the clearance valve K in Figure 2 as stated remains closed and when the port *h* in the piston *a'* registers with the port 5 for the last step of unloading, the inlet valve O' is opened and since the inlet valve O at the opposite end of the cylinder is maintained opened because port 6 registers with port *e*, the cylinder is wholly unloaded.

I claim:

1. In a compressor unloader, the combination of a cylinder and piston, inlet and discharge valves, a receiver, two clearance chambers for one end of the cylinder, clearance valves for said chambers, means for holding open one of the inlet valves for the opposite end of the cylinder, and fluid actuated means responsive to receiver pressure for actuating said clearance valves and said inlet valve opener to unload and load the compressor in steps.

2. In a compressor unloader, the combination of a cylinder and piston, inlet and discharge valves, a receiver, two clearance chambers for one end of the cylinder, clearance valves for said chambers, means for holding open one of the inlet valves for the opposite end of the cylinder, and fluid actuated means responsive to receiver pressure for unloading the compressor by first holding open one clearance valve, then opening the other clearance valve, then closing one clearance valve and holding the said inlet valve open and finally wholly unloading the compressor.

3. In a compressor unloader, the combination of a cylinder and piston, inlet and discharge valves, a receiver, two clearance chambers for one end of the cylinder, clearance valves for said chambers, means for holding open one of the inlet valves for the opposite end of the cylinder, and fluid actuated means responsive to receiver pressure for unloading the compressor by first holding open one clearance valve, then opening the other clearance valve, then closing one clearance valve and holding the said inlet valve open and finally wholly unloading the compressor by reopening the said clearance valve which had been previously closed.

4. In a compressor unloader, the combination of a cylinder and piston, inlet and discharge valves, a receiver, two clearance chambers for one end of the cylinder, clearance valves for said chambers, means for holding open an inlet valve at each end of the cylinder, and fluid actuated means responsive to receiver pressure for actuating said clearance valves and said inlet valve openers to unload and load the compressor in steps.

In testimony whereof I have signed this specification.

SNOWDEN B. REDFIELD.